United States Patent [19]

Kitayama et al.

[11] 4,053,307
[45] Oct. 11, 1977

[54] PROCESS FOR MANUFACTURE OF HIGH-CHROMIUM IRON ALLOY

[75] Inventors: Tatsuo Kitayama; Fumihiko Kusama; Seigo Tomaru; Akira Ebinuma, all of Chichibu, Japan

[73] Assignee: Showa Denko K. K., Tokyo, Japan

[21] Appl. No.: 649,894

[22] Filed: Jan. 16, 1976

[51] Int. Cl.² .............................................. C22C 33/04
[52] U.S. Cl. .................................................... 75/130.5
[58] Field of Search ........................................ 75/130.5

[56] References Cited

U.S. PATENT DOCUMENTS

| | | | |
|---|---|---|---|
| 2,542,177 | 2/1951 | Briney | 75/130.5 |
| 3,158,464 | 11/1964 | Chynoweth | 75/130.5 |
| 3,754,900 | 8/1973 | Aukrust | 75/130.5 |

*Primary Examiner*—P. D. Rosenberg
*Attorney, Agent, or Firm*—Oblon, Fisher, Spivak, McClelland & Maier

[57] ABSTRACT

Treatment, with quick lime, of a chromium ore of which the Cr/Fe weight ratio is not less than 1.6 produces a primary slag; reduction of the primary slag with a silicic reducing agent produces a secondary slag in conjunction with a by-produced metal; further reduction of the secondary slag gives rise to a tertiary slag in conjunction with a high-chromium iron alloy of which the combined content of chromium and iron is not less than 90% by weight and the Cr/Fe weight ratio is not less than 4.0; and, as occasion demands, silicochromium is derived in conjunction with waste slag from the tertiary slag.

3 Claims, 3 Drawing Figures

PROCESS FOR MANUFACTURE OF HIGH-CHROMIUM IRON ALLOY

BACKGROUND OF THE INVENTION

This invention relates to a process for the manufacture of a high-chromium iron alloy which contains a total of not less than 90% by weight of chromium and iron, the Cr/Fe weight ratio being not less than 4.0, and not more than 10% by weight of carbon plus a trace of impurities. This iron alloy is useful as an additive for alloys having small iron content.

As the additive for this purpose, there has heretofore been used metallic chromium. Metallic chromium is chiefly produced by the so-called thermit process involving reduction of chromium oxide such as with aluminum or silicon or by the process involving electrolysis of an aqueous solution. Whichever process may be used, the production is so costly that uses found for the product have been rather limited.

Many of the chromium-containing alloys tolerate inclusion of small amounts of iron. Particularly in recent years, as the development of uses has gained in scope, the ability of chromium-based alloys containing small amounts of iron to resist heat and corrosion has come to attract attention. Consequently, the demand for such alloys is steadily on the increase.

A process whereby a mixture consisting of chromium and iron at a ratio of about 3 is obtained from a chromium ore having small chromium and iron contents and a small Cr/Fe ratio has been disclosed by U.S. Pat. No. 2,971,834. From a chromium ore which has a chromium content of 30% and an iron content of 19% and therfore has a Cr/Fe ratio of about 1.6, for example, this process produces a slag containing chromium and iron at a Cr/Fe ratio of about 3.1 and a metal alloy having an iron content of 83% and a chromium content of about 15% by reducing said chromium ore with a silicon reducing agent.

The present invention, in contrast, is characterized by the fact that it produces a high-chromium iron alloy having a total of not less than 90% of chromium and iron contents and therefore having a Cr/Fe weight ratio of not less than 4.0 and also by the fact that said iron alloy contains impurities such as P, Ni and Co in negligibly small amounts. Thus, the present invention constitutes a technique which has never existed in the prior art.

An object of the present invention is to provide a highly economical process for the manufacture of a high-chromium iron alloy which proves to be useful as an additive for alloys of small iron contents.

BRIEF SUMMARY OF THE INVENTION

To attain the object described above according to the present invention, there is provided a process which comprises treating, with quick lime, a chromium ore containing chromium and iron and having a Cr/Fe weight ratio of not less than 1.6 for thereby producing a molten primary slag, adding to said primary slag a silicic reducing agent in an amount of from 0.2 to 0.8 times the theoretical amount required for reducing the chromium oxide and iron oxide contained in said slag for thereby producing a secondary slag in conjunction with a metal phase containing from 20 to 65% by weight of chromium and containing most of the impurities nobler than chromium in said first slag, and again adding a silicic reducing agent to the secondary slag for thereby producing a high-chromium iron alloy as the product aimed at in conjunction with a tertiary slag phase.

Further, as occasion demands, silicon is added in an excess amount to said tertiary slag phase to reduce the chromium oxide present in the slag and, consequently, produce silico-chromium in conjunction with waste slag.

The silico-chromium thus obtained may be used as the reducing agent necessary for addition to the primary slag and the secondary slag. The high-chromium iron alloy which is obtained by the process of the present invention has a total of not less than 90% by weight of chromium and iron contents, the Cr/Fe weight ratio being not less than 4.0, with the balance consisting of carbon and silicon plus impurities in very small amounts.

DETAILED DESCRIPTION OF THE INVENTION

Figure 1:
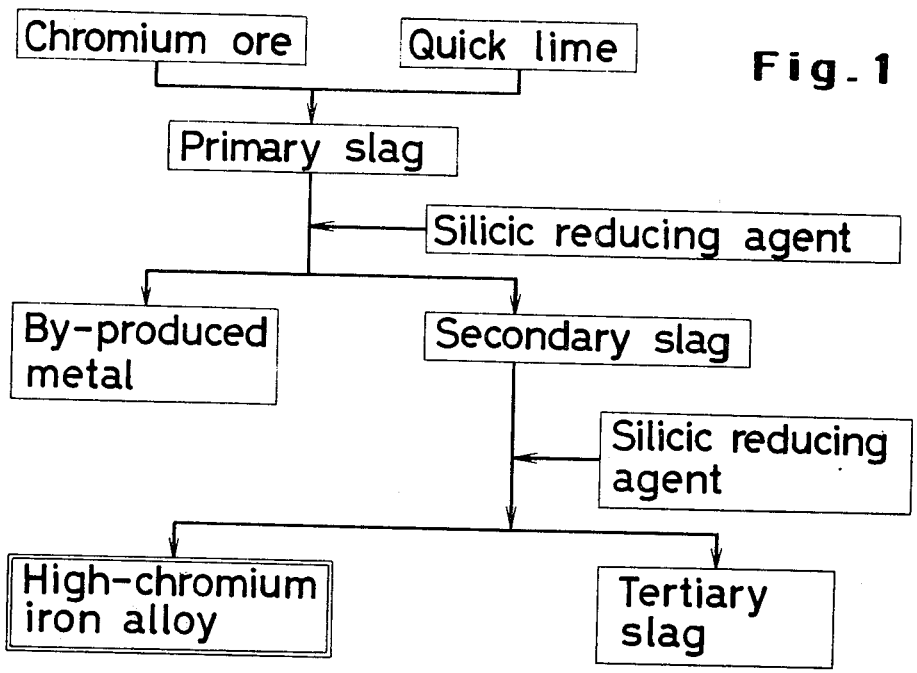
FIG. 1 is a flow diagram illustrating the basic process for practicing the present invention.

Substantially the process of the present invention is effected by causing a chromium ore as the starting material to be melt-reduced such as by means of an electric furnace. Unlike the conventional process for the production of metallic chromium, it obviates the necessity for converting said raw material in advance into chromium oxide or chromium sulfate and enables the chromium ore to be directly used, in its unaltered form, in the reduction. Since the melting of the ore is accomplished in an electric furnace, this process permits bulk production. Thus, the process proves to be highly advantageous from the economic point of view. The iron alloy produced by this porcess enjoys a freedom from impurities which compares favorably with that enjoyed by metallic chromium.

Now, the present invention will be described with reference to FIG. 1 which illustrates the fundamental process of the present invention. As the first step, a chromium ore containing chromium and iron at a weight ratio of not less than 1.6 is mixed with quick lime and the mixture is melted by application of heat to obtain a primary slag. Any chromium ore can be used the present invention insofar as it satisfies the requirement that, as described above, the chromium and iron contents thereof have a Cr/Fe weight ratio of not less than 1.6. Although the weight ratio of the chromium and iron contents in most cases do not exceed 4.0, there are a few sorts of chromium ore which have greater Cr/Fe ratio than 4.0. The mixing ratio of quick lime to the chromium ore is suitable in the range of from 0.5 to 1 part by weight of quick lime to 1 part by weight of the chromium ore. The melting of the mixture is generally carried out in an electric furnace. Then, a silicic reducing agent is added to the resultant molten primary slag. Since thorough agitation of the slag is necessary for uniform distribution of the reducing agent, it is desirable that the addition of said reducing agent be carried out after the molten primary slag has been transferred from the electric furnace into a ladle or some other vessel adapted to permit agitation of the slag. The reduction thus brought about is exothermal in nature and has a possibility of corroding the ladle. To preclude this possibility, it is desirable that the reducing agent be added piecemeal in several fractions into the molten slag while the latter is kept under continued agitation. The reaction temperature in this case is desired to be maintained at as high a level as practicable above lower limit of 1,600° C in consideration of the fact that the secondary slag to be consequently produced is destined to undergo further reduction in the subsequent step. The agitation may be accomplished by causing the slag to be shaken. A method whereby thorough agitation and admixture is obtained by having a given molten matter alternately transferred between two ladles (U.S. Pat. No. 3,334,884) is effective in obtaining the desired agitation. As the silicic reducing agent for addition to the slag, there may be used metallic silicon, silico-chromium, ferro-silico-chromium having an iron content of less than 25%, ferro-silicon preferably having an iron content of less than 20%, or the silico-chromium which is obtained in the reduction of the tertiary slag to be described afterward. Of course, these silicon compounds may be used in combination when necessary. A relation of equilibrium exists between the metal phase containing the reduced chromium and the chromium oxide present in the slag which are produced in consequence of the reduction reaction. It is, therefore, necessary to heighten the chromium content in the metal phase and increase the chromium concentration in the secondary slag in order that the high-chromium iron alloy to be eventually obtained as the product may have a total of not less than 90% by weight of chromium and iron contents and a Cr/Fe weight ratio of not less than 4.0. When a ferro-silico-chromium reducing agent containing iron is to be used for this purpose, therefore, it is desirable that the Cr/Fe ratio of the components of said reducing agent be as high as permissible. When ferro-silicon is used for the same purpose, it is desired to have as low an iron content as permissible.

The amount of the silicic reducing agent to be added is in the range of from 0.2 to 0.8 times the theoretical amount required in order for the silicon present therein to convert the iron oxide and chromium oxide into their respective metals in accordance with the following chemical formulas:

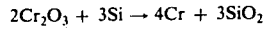

Figure 2:
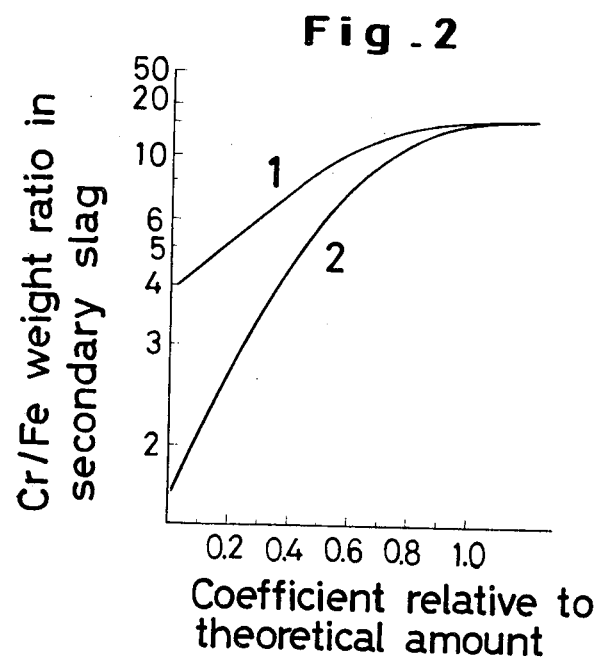
FIG. 2 is a graph showing the relation between the amount of the silicic reducing agent added to the primary slag and the Cr/Fe ratio found in the secondary slag produced consequently.

If the silicon content of the silicic reducing agent in use fails to reach the lower limit, 0.2 times the theoretical amount described above, then the Cr/Fe weight ratio in the secondary slag consequently obtained does not exceed 5.0, making it impossible to manufacture the high-chromium iron alloy aimed at by the present invention. The Cr/Fe weight ratio increases with the increasing amount of silicon to be added. This increase of the Cr/Fe ratio is substantially limited to about 0.8 times the theoretical amount, beyond which level there can be obtained practically no increases. Addition of the reducing agent beyond this upper limit is undesirable because the excess reducing agent only serves to increase the metal phase (by-produced metal) alone without any advantage and, consequently, lower the chromium oxide content of the secondary slag. FIG. 2 is a graph showing the Cr/Fe ratio in the secondary slag as a function of the amount of the reducing agent to be added. In this graph, the vertical axis is graduated for the Cr/Fe weight ratio in the secondary slag and the horizontal axis is graduated for the ratio of the amount of silicon actually added in the form of reducing agent to the theoretical amount of silicon required for thorough reduction of the chromium and iron components present in the slag. In this graph, the curve 1 represents the data obtained of a raw ore whose Cr/Fe weight ratio is 4.0 and the curve 2 the data obtained of a raw ore having a Cr/Fe weight ratio of 1.6. The Cr/Fe ratio in the secondary slag varies with the Cr/Fe ratio in the raw ore even if the amount of silicon added remains unchanged. The data given in FIG. 2 holds good insofar as the chromium ore in use satisfies the requirement of this invention that the Cr/Fe weight ratio fall in the range of from 1.6 to 4.0. Where the Cr/Fe ratio of the chromium ore is 4.0, therefore, the amount of silicon added in the form of reducing agent has only to reach the lower limit, 0.2 times the theoretical amount, in order that the secondary slag may have a Cr/Fe ratio of 5.0. It is, of course, necessary to increase the amount of silicon added relative to the theoretical amount in proportion as the Cr/Fe ratio of the chromium ore decreases. When the reaction system is left to stand at rest after completion of the reaction, a secondary slag phase forms in the upper region and a metal phase forms in the lower region. The metal phase is a by-produced metal having a chromium content of from 20 to 65% and containing the greater part of the impurities such as P, Ni and Co, whereas the secondary slag phase has a Cr/Fe ratio of not less than 5.0. The two phases, therefore, are separated from each other so that the by-produced metal can be marketed in its unmodified form as a low-carbon ferro-chromium. Subsequently the secondary slag is reduced by treatment using metallic silicon or silicon carbide or silico-chromium containing substantially no iron either independently of each other or in combination in the form of a mixture. Of these silicic compounds, silico-chromium proves to be an advantageous choice because the silico-chromium to be derived as a by-product from the tertiary slag which will be described later can be used. If the amount of the reducing agent added approaches its theoretical amount, part of the introduced silicon passes into the metal phase and impairs the worth of the alloy aimed at by the present invention. If it is too small, the amount of chromium which passes into the tertiary slag phase increases excessively. Preferably, therefore, the amount of the reducing agent to be added is in the range of from 0.5 to 0.9 times the theoretical amount, calculated as silicon.

During this reduction, the reaction system is desired to be thoroughly agitated by causing the system under treatment to be alternately transferred, as described previously, between two ladles. And the reduction is required to proceed at temperatures in the range of from 1,750° to 2,050° C. Being an exothermic reaction, the reduction proceeds with evolution of a large amount of heat except when the reducing agent in use is silicon carbide. For the purpose of preventing the ladles from possible damage and ensuring safety of operation, it is desirable that the reducing agent be added piecemeal in several fractions into the reaction system. The reducing agent which is used in this reaction generally has a low specific gravity and, accordingly, tends to float up to the surface of slag. For uniform distribution, therefore, the introduction of each fraction of the reducing agent into the slage is desired to be made in such a way that said fraction flows simultaneously with the stream of slag in motion from one ladle into the other and it joins the slag evenly over a length of time instead of joining it all at once. When the reducing agent is silicon carbide, the amount of heat evolved during the reaction is rather deficient and the temperature of the reaction system falls to entail a possibility that the reaction will fail to proceed sufficiently. In this case, some measure must be taken as for applying heat to the reaction system from outside. When the reaction is completed, a tertiary slag phase is produced in the upper region and a metal phase in the lower region.

The metal phase thus obtained had a total of not less than 90% of chromium and iron and a Cr/Fe weight ratio of not less than 4.0, with the balance comprising not more than 10% of carbon and silicon plus a trace of impurities. When silicon carbide is used as the reducing agent for the secondary slag, carbon content in the metal phase can reach a maximum of near 10%. When any other silicic reducing agent is used, the metal phase has a low carbon content and consists substantially completely of chromium and iron except for a trace of impurities. The impurities, though variable with the raw ore and the particular kinds of quick lime and other raw materials to be used, generally comprise not more than 1% of Si, less than 0.015% of P, less than 0.015% of S, less than 0.060% of Ni, less than 0.020% of Co, etc. Particularly when the secondary slag is obtained, most of the elements nobler than chromium reductively pass into the by-produced metal phase and, therefore, are vastly diminished in volume. Thus, the purity is favorably comparable with that of metallic chromium and is decidely higher than that of ferro-chromium obtained by the ordinary silicide process. There has long existed an idea of depriving an ore of its impurities by causing the impurities to be reduced in advance. The technique embodying this idea has failed to provide sufficient removal of such impurities, because it is concerned with the reaction of impurities' reduction purely from the theoretical point of view. The present invention is characterized in the fact that the removal of impurities is accomplished by causing the reaction by using a silicic reducing agent for thereby producing a considerable amount of $SiO_2$ in the secondary slag and consequently improving the fluidity of the slag.

The tertiary slag contains approximately from 6 to 11% of chromium oxide and has a Cr/Fe weight ratio of not less than 5.0 similarly to that mentioned previously. Since the metal phase has a high chromium content, it is inevitable that the chromium oxide present in the slage which bears an equilibrium relationship with the chromium content passes into the metal phase to some extent. Economically, recovery of this chromium is also important. By efficiently recovering this chromium, there can be obtained silico-chromium substantially free from iron which passes as a marketable product.

The commercial worth of the present invention can be enhanced by recycling this silico-chromium to the process of this invention.

Figure 3:
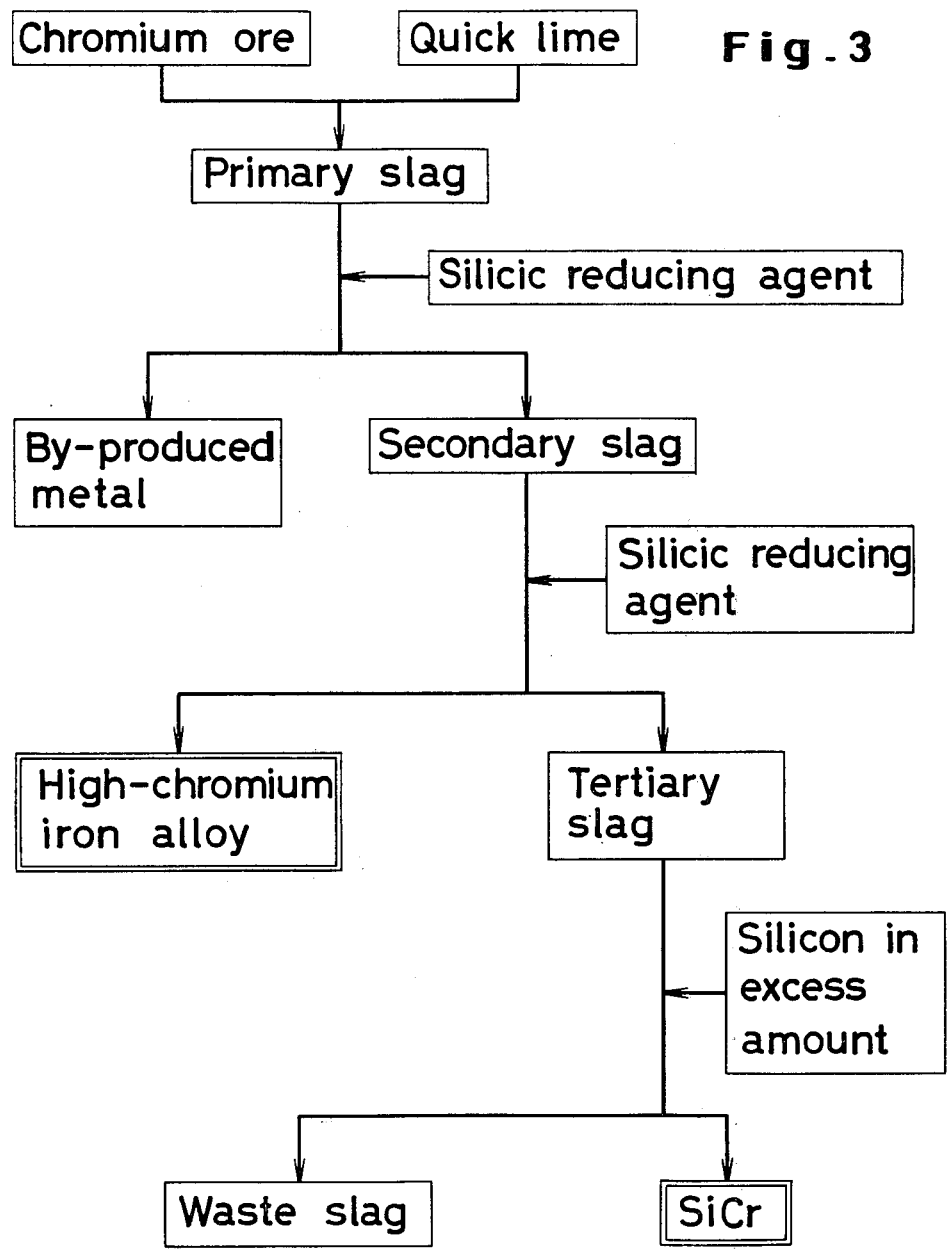
FIG. 3 is a flow diagram illustrating the process for producing silico-chromium from the tertiary slag in accordance with the present invention.

The phase of this invention relating to the utilization of said tertiary slag will now be described with reference to FIG. 3.

In the flow diagram, the portion of the procedure comprising treatment of raw materials, formation of primary slag, reduction of primary slag, occurrence of by-produced metal, formation of secondary slag and production of tertiary slag and high-chromium iron alloy as the product is entirely the same as the whole procedure illustrated in FIG. 1. In the flow diagram of FIG. 3, to the tertiary slag, there is added metallic silicon in an amount in excess of the theoretical amount required for reduction. Specifically, said amount of metallic silicon is two times or more and preferably three times the theoretical amount required for reducing the oxides of chromium and iron into their respective metals. When the metallic silicon is added to the tertiary slag, the slag must be agitated in much the same way as when the reducing agent was added in the preceding step. In this case, the reaction system must be maintained at temperatures exceeding 1,550° C. When the reaction system is left to stand at rest after its completion, a waste slag phase is formed in the upper region and a silico-chromium metal phase in the lower region. When the metallic silicon has been added in an ample excess, the waste slag phase has practically no chromium and iron contents. The other metal phase consists of silico-chromium and contains substantially no iron. Since the tertiary slag phase is substantially free from P, Ni, Co and other impurities, the silico-chromium thus obtained contains such purities in extremely small amounts. It goes without saying that the silicon concentration in this silico-chromium increases with the increasing amount of silicon which is added for the reaction of reduction. Since this silico-chromium can be used for the reduction of the primary slag and the secondary slag, if the metallic silicon is added in large excess in this step, it is not wasted at all unless said excess is such that the silicon content is more than is required in said reduction. Further, the chromium oxide in the tertiary slag is not present as the oxide having a high degree of oxidation which is normally produced in the melting of a chromium ore and quick lime but is converted back to an oxide having a low degree of oxidation. As a result, the reactional efficiency of the silicon is so high as to make use of expensive metallic silicon worthwhile. Addition of such metallic silicon in large excess ensures perfect recovery of chromium from the slags and therefore proves rather advantageous than otherwise in that it all the more enhances the merit of the present invention as an integral process.

The present invention will be described specifically herein below with reference to preferred embodiments, which are solely illustrative and not in the least limitative of the present invention.

EXAMPLE 1

A mixture consisting of 59 parts by weight of a chromium ore having a Cr/Fe weight ratio of 3.6 as illustrated in Table 1, and 41 parts by weight of quick lime was melted in a threephase Heroult electric furnace rated for 5,000 KVA to obtain a primary slag. In a ladle lined with magnesia, 4,200 kg of the primary slag was received and, with 330 kg (0.45 times the theoretical amount) of a reducing agent in a solid form added piecemeal thereto, agitated vigrously at temperatures maintained in the range of from 1,920° to 1,950° C to produce a secondary slag in conjunction with a metal phase (by-produced metal). The amount of this metal phase was 430 kg.

Table 1

|  | Cr₂O₃ (%) | FeO (%) | SiO₂ (%) | Al₂O₃ (%) | MgO (%) | CaO (%) | Cr/Fe (%) |
|---|---|---|---|---|---|---|---|
| Chromium ore | 53.7 | 13.1 | 3.4 | 16.2 | 11.7 | tr | 3.6 |
| Quick lime |  |  |  |  |  | 96 |  |
| Primary slag | 31.8 | 7.8 | 2.2 | 9.6 | 6.9 | 40.7 |  |
| Secondary slag | 28.3 | 1.5 | 11.3 | 9.4 | 8.0 | 40.1 | 16.6 |
|  | Cr | Fe | Si |  |  |  |  |
| Reducing agent | 38.2 | 1.8 | 58.6 |  |  |  | 21.2 |
| Metal phase | 47.9 | 50.2 | 0.02 |  |  |  |  |

Of the secondary slag and the metal phase obtained in the preceding step, a 3,500-kg portion of the secondary phase was separated and received in a three-phase Heroult electric furnace rated for 2,000 KVA. On that occasion, 330 kg of a reducing agent indicated in Table 2 (0.73 times the theoretical amount) was added to the secondary slag. Under a load of 1,600 KWH, the contents of the furnace were caused to undergo reaction for 30 minutes at temperatures maintained in the range of from 1,900° to 1,930° C. Consequently, there were obtained a tertiary slag and a metal phase indicated in Table 2. The amount of the metal phase was 580 kg. The metal phase was a high-chromium iron alloy having a total of 90.7% of chromium and iron and a Cr/Fe weight ratio of 20.0.

Table 2

|  | Cr₂O₃ (%) | FeO (%) | SiO₂ (%) | Al₂O₃ (%) | MgO (%) | CaO (%) | Cr/Fe (%) |
|---|---|---|---|---|---|---|---|
| Tertiary slag | 7.8 | 0.5 | 26.2 | 10.4 | 9.1 | 44.4 | 13.7 |
|  | Cr | Fe | Si | SiC | FeO | C |  |
| Reducing agent |  |  |  | 88.2 | 1.5 | 3.3 |  |
| Metal phase | 86.4 | 4.3 | 0.8 |  |  | 7.8 | 20.0 |

EXAMPLE 2

A mixture consisting of 60 parts by weight of a chromium ore having a Cr/Fe weight ratio of 2.7 as indicated in Table 3 and 40 parts by weight of quick lime was melted in a threephase Heroult electric furnace rated for 5,000 KVA to afford a primary slag. In a ladle lined with magnesia, 4,500 kg of the primary slag was received and, with 480 kg (0.40 times the theoretical amount) of a reducing agent added thereto, agitated vigorously at temperatures maintained in the range of from 1,920° to 1,950° C. Consequently, there were obtained a secondary slag and a metal phase indicated in Table 3. The amount of this metal phase was 570 kg.

Table 3

|  | Cr₂O₃ (%) | FeO (%) | SiO₂ (%) | Al₂O₃ (%) | MgO (%) | CaO (%) | Cr/Fe (%) |
|---|---|---|---|---|---|---|---|
| Chromium ore | 54.1 | 16.5 | 1.5 | 13.5 | 13.6 | tr | 2.9 |
| Quick lime |  |  |  |  |  | 96 |  |
| Primary slag | 32.9 | 9.9 | 1.9 | 7.8 | 8.0 | 39.1 |  |
| Secondary slag | 31.2 | 2.1 | 11.1 | 7.6 | 9.3 | 38.1 | 13.1 |
|  | Cr | Fe | Si |  |  |  |  |
| Reducing agent | 43.1 | 12.9 | 41.7 |  |  |  | 3.3 |
| Metal phase | 40.6 | 58.0 | 0.01 |  |  |  |  |

Of the secondary slag and the metal phase obtained in the preceding step, a 4,000-kg portion of the secondary slag was separated and received in the same ladle as mentioned above. On that occasion, 100 kg of a reducing agent 1 and 230 kg of a reducing agent 2 (0.80 times the theoretical amount) both in solid state were added into the secondary slag. The slag and the added reducing agents were vigorously agitated to undergo reaction at temperatures from 1,840° to 1,880° C. The reducing agent 1 was what had been obtained from the tertiary slag according to the present invention. Consequently, there were obtained a tertiary slag in conjunction with 770 kg of a metal phase as indicated in Table 4. This metal phase was a high-chromium iron alloy having a total of 98.3% by weight of chromium and iron and a Cr/Fe weight ratio of 12.7.

Table 4

|  | Cr₂O₃ (%) | FeO (%) | SiO₂ (%) | Al₂O₃ (%) | MgO (%) | CaO (%) | Cr/Fe (%) |
|---|---|---|---|---|---|---|---|
| Tertiary slag | 7.0 | 0.6 | 29.1 | 8.7 | 11.1 | 42.7 | 10.3 |
|  | Cr | Fe | Si |  |  |  |  |
| Reducing agent 1 | 33.9 | 1.3 | 63.4 |  |  |  |  |
| Reducing agent 2 | — | 0.8 | 98.2 |  |  |  |  |
| Metal phase | 91.1 | 7.2 | 0.7 |  |  |  | 12.7 |

In a separate ladle, 2,700 kg of the tertiary slag was received and 250 kg (4.7 times the theoretical amount) of a reducing agent 2 indicated in Table 4 was added thereto. The slag and the added reducing agent were vigorously agitated at temperatures maintained in the range of from 1,700° to 1,800° C to undergo reaction. Consequently, there were obtained a metal phase in conjunction with waste slag as indicated in Table 5. The amount of the metal phase was 310 kg.

Table 5

|  | $Cr_2O_3$ (%) | FeO (%) | $SiO_2$ (%) | $Al_2O_3$ (%) | MgO (%) | CaO (%) | Cr/Fe (%) |
| --- | --- | --- | --- | --- | --- | --- | --- |
| Waste slag | 0.9 | 0.3 | 34.4 | 8.9 | 11.5 | 43.7 |  |
|  | Cr | Fe | Si |  |  |  |  |
| Metal phase | 34.2 | 1.6 | 62.5 |  |  |  |  |

The trace components involved in this example were as shown in Table 6 below. It is seen from the table that most of the impurities contained in the primary slag were no longer present in the secondary slag and that the contents of impurities were extremely small in metal phases or high-chromium iron alloys.

Table 6

|  | P (%) | Ni (%) | Co (%) | Zn (%) | Cu (%) |
| --- | --- | --- | --- | --- | --- |
| Primary slag | 0.005 | 0.087 | 0.014 | 0.025 | 0.008 |
| Secondary slag | 0.001 | 0.002 | 0.001 | 0.001 | tr |
| Reducing agent (Table 3) | 0.022 | 0.150 | 0.041 | 0.009 | 0.012 |
| Metal phase (Table 3) | 0.047 | 0.80 | 0.142 | 0.051 | 0.067 |
| Reducing agent 1 (Table 4) | 0.002 | 0.010 | 0.005 | 0.001 | 0.005 |
| Reducing agent 2 (Table 4) | 0.003 | 0.014 | 0.006 | 0.001 | 0.011 |
| Metal phase (Table 4) | 0.004 | 0.017 | 0.008 | 0.006 | 0.004 |

What is claimed is:

1. A process for the manufacture of a high-chromium iron alloy containing a total of not less than 90% of iron and chromium and having a Cr/Fe weight of not less than 4.0 and a silico-chromium alloy, which process comprises the steps of mixing a chromium ore containing chromium oxide and iron oxide at a Cr/Fe weight ratio of not less than 1.6 with quick lime, heating the resultant mixture to melt it and produce a primary slag, adding to the primary slag at least one silicon-containing reducing agent selected from the group consisting of metallic silicon, silicon-chromium, ferro-silico-chromium and ferro-silicon in an amount such that the silicon content thereof equals 0.2 to 0.8 times the theoretical amount required for reduction of the iron oxide and chromium oxide present in said primary slag and such that the secondary slag subsequently obtained has a Cr/Fe weight ratio greater than 5, heating the primary slag incorporating therein the added reducing agent at temperatures not less than 1,600° C to undergo reaction, allowing the primary slag which has undergone said reaction to stand at rest for thereby producing a secondary slag in the upper region and a metal phase in the lower region, separating the metal phase to obtain a by-produced metal containing from 20 to 65% by weight of chromium, adding to the secondary slag phase at least one reducing agent selected from the group consisting of metallic silicon, silicon carbide and silico-chromium having no iron content while said slag phase is maintained at temperatures of from 1,750° to 2,050° C for thereby inducing a reaction, allowing the secondary slag which has undergone said reaction to stand at rest for thereby producing a tertiary slag phase in the upper region and an iron alloy phase containing a total of not less than 90% of iron and chromium and having a Cr/Fe weight ratio of not less than 4.0 in the lower region, separating the lower phase to obtain a high-chromium iron alloy containing a total of not less 90% of iron and chromium and having a Cr/Fe weight ratio of not less than 4.0, adding to the tertiary slag phase metallic silicon in an amount in excess of the theoretical amount required for reducing the chromium oxide and the metallic chromium present in said tertiary slag an heating the slag and the added reducing agent at temperatures exceeding 1,550° C for thereby inducing a reaction, allowing the tertiary slag which has undergone said reaction to stand at rest for thereby producing waste slag in the upper region and a silico-chromium alloy phase in the lower region, and separating the silico-chromium alloy phase to obtain silico-chromium.

2. The process set forth in claim 1, wherein the amount of the reducing agent to be added to the secondary slag phase is such that the silicon content present in the reducing agent is from 0.5 to 0.9 times the theoretical amount required for reduction of the iron oxide and the chromium oxide contained in said secondary slag phase.

3. The process set forth in claim 1, wherein the silico-chromium separated from the tertiary slag phase is used as the reducing agent for the primary slag or the secondary slag or for both.

* * * * *